April 7, 1959 J. VAN POOL 2,881,235
PROCESS CONTROL METHOD AND APPARATUS
Filed March 20, 1957 2 Sheets-Sheet 1

INVENTOR.
JOE VAN POOL
BY Hudson & Young
ATTORNEYS

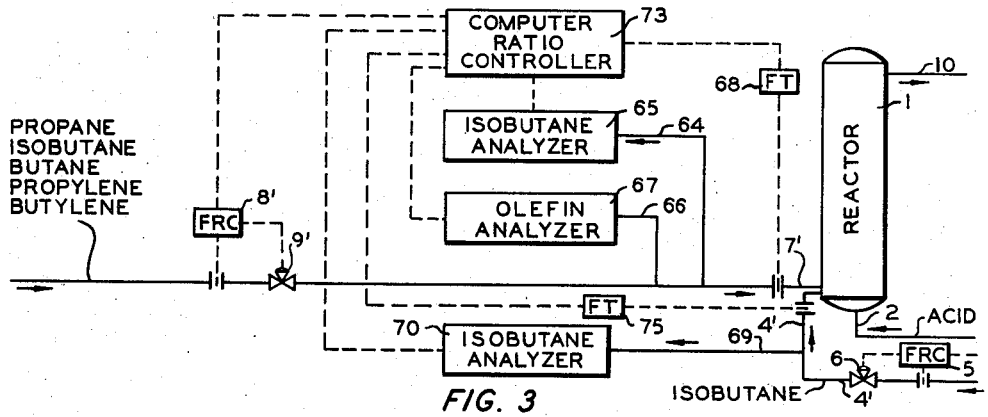
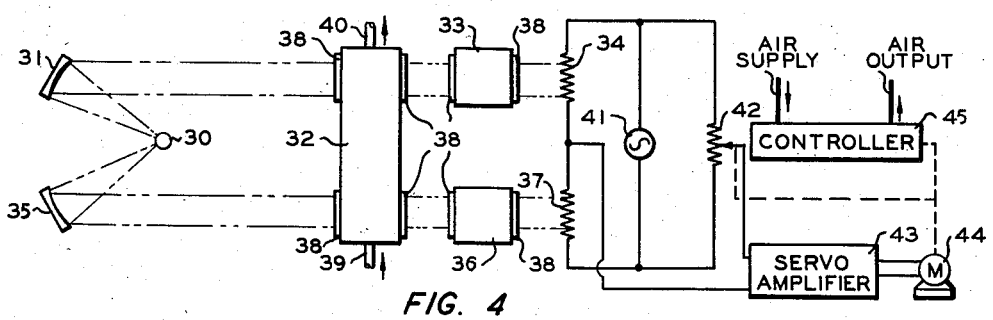
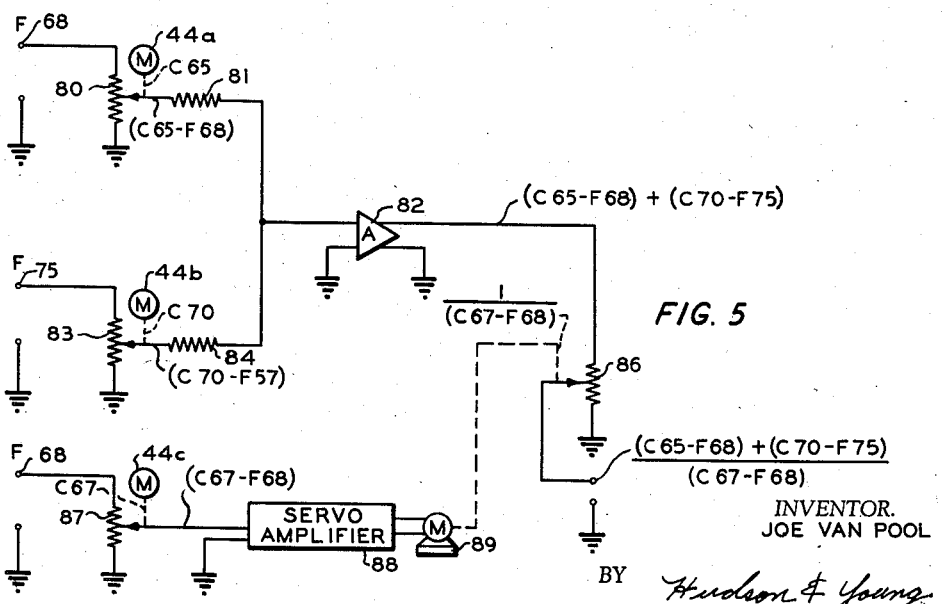
INVENTOR.
JOE VAN POOL
BY Hudson & Young
ATTORNEYS

2,881,235
PROCESS CONTROL METHOD AND APPARATUS

Joe Van Pool, Bartlesville, Okla., assignor to Phillips Petroleum Company, a corporation of Delaware Application March 20, 1957, Serial No. 647,386

13 Claims. (Cl. 260—683.48)

This invention relates to an improved control method and to an improved control system for alkylation processes.

The demand for large volumes of high quality gasolines has brought about the development and commercialization of a number of processes for the conversion of non-gasoline range hydrocarbons into high octane blending stocks. One of these processes, the alkylation of light olefins, such as propylene and butylenes, with isobutane, using liquid hydrofluoric acid as the catalyst, has proved to be particularly effective in producing alkylates for aviation and motor fuel blending. As the result of considerable operational experience, this process has now been developed to such an extent that a commercial plant can be controlled by two men per shift to obtain desired product quality with safety. However, a substantial expenditure of laboratory and process engineering time still is required to coordinate the operations and to manipulate the process variables toward the economic optimum.

In the operation of an alkylation plant, one of the most important factors to be controlled is the ratio of isoparaffins to olefin hydrocarbons to be fed to the reactor. An excess of isoparaffin is employed in order to improve the quality of the product alkylate obtained. On the other hand, too high an excess results in uneconomic operation, as is understood in the art. There is, therefore, an economic optimum ratio of isoparaffins to olefins to be employed in an alkylation reaction, the ratio varying somewhat with the reaction variables such as temperature, acid strength, etc. Another factor which is improtant in consideration of the control of an alkylation plant is the rate of production of hydrocarbons from the reaction vessel. This is because many alkylation plants are so designed, and economically so, that the product separation equipment, that is the distillation equipment, is so sized that it becomes the limiting factor in the capacity of the plant. It is desirable, of course, to operate at maximum capacity of the plant for economic reasons, but care must be taken so that the product distillation towers are not overloaded, with resultant flooding.

Accordingly, it is an object of this invention to provide an improved control system for an alkylation process. Another object is to provide a control system and a method for control of an alkylation plant to adjust and control the ratio of isoparaffins to olefins supplied to an alkylation reactor, and at the same time to maintain a substantially constant rate of product hydrocarbons from the alkylation reactor to the distillation zone of the plant.

Other objects and advantages as well as aspects of this invention should become apparent from the following detailed description.

In accordance with the present invention, an improved control method and an improved control system for an alkylation process is provided. The total feed stream to the reactor, which comprises paraffin and olefin hydrocarbons, is analyzed to determine the ratio of isoparaffins to olefins. A ratio controller is provided to adjust the flow of the olefin feed stream in response to the analysis ratio so that the isoparaffins and olefins supplied to the reactor are maintained at a desired substantially constant ratio to obtain optimum economic operation. At the same time, the hydrocarbon phase effluent from the reactor is accumulated and fed at a constant rate to a distillation zone comprising one or more distillation towers, and any small change in the rate of accumulation of said effluent hydrocarbons causes a change in the rate of flow of isoparaffins to the reactor. In this manner, the ratio of isoparaffins to olefins is maintained at a substantially constant optimum ratio and at the same time the rate of flow of effluent hydrocarbons from the reactor, through the accumulator and to the distillation zone is maintained substantially constant, and at the maximum desired rate below the flooding point in the distillation system.

Figure 3 is a schematic representation of another embodiment of a control system of this invention which can be used in the alkylation plant of Figures 1 and 2 when it is desired to feed separate olefin and isobutane streams to the reactor.

Figure 4 is a schematic representation of an infrared analyzer which can be employed in the control system of Figures 1, 2 and 3.

Figure 5 is a schematic representation of a computer ratio controller which can be employed in the control system of Figure 3.

Figure 1:
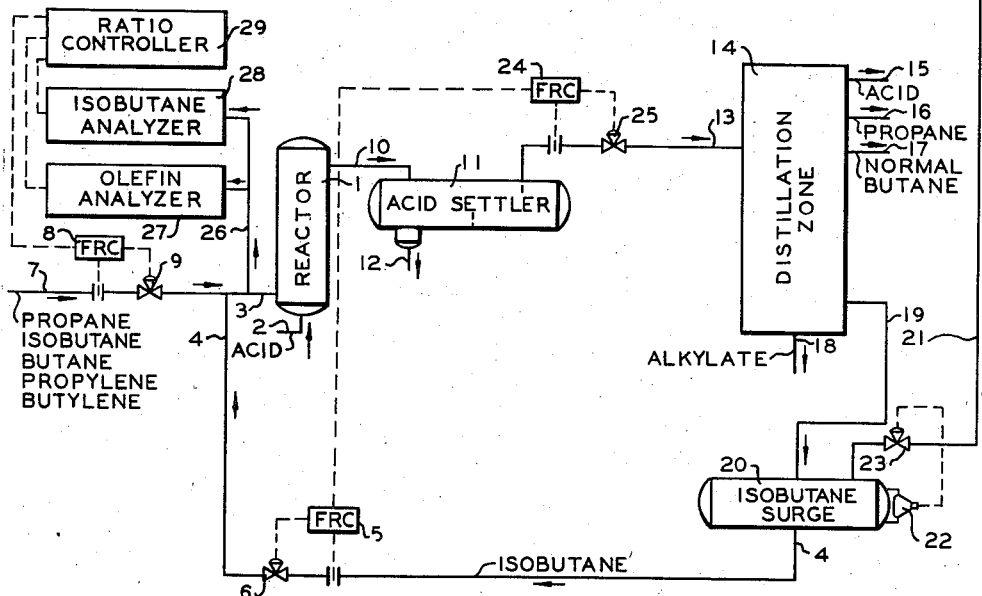
Figure 1 is a schematic representation of a hydrofluoric acid alkylation process having a control system of this invention incorporated therein.

Referring to Figure 1, there is shown an alkylation reactor 1 which has an inlet conduit 2 communicating therewith to supply liquid hydrofluoric acid. A hydrocarbon feed stream is introduced into reactor 1 through conduit 3. An isobutane feed stream is introduced into reactor 1 through conduit 4. The flow through conduit 4 is regulated by flow rate controller 5 which adjusts valve 6. An olefin stream, which can be a mixture of propylene and butylenes, for example, is supplied to conduit 3 through conduit 7. The flow rate through conduit 7 is regulated by flow rate controller 8 which adjusts valve 9. The alkylation reaction is effected in reactor 1 by intimately contacting the hydrocarbons with the hydrofluoric acid catalyst. The hydrofluoric acid-hydrocarbon mixture is removed from reactor 1 through a conduit 10 to acid settler 11, which is a separation zone for acid and hydrocarbon phases and serves as an accumulator for each of these phases. The acid phase in settler 11 is withdrawn through conduit 12 to acid purification means not shown, as is understood in the art. The ratio of acid to hydrocarbon supplied to reactor 1 is usually controlled at a selected level between approximately 0.2:1 to 1:1 parts by weight.

Hydrocarbons from reactor 1 which are accumulated in a zone in a separate phase in vessel 11 pass from that vessel through line 13 at a controlled constant rate to distillation zone 14, which comprises at least two and usually more than two distillation towers in series. In this embodiment, the rate of flow of hydrocarbon phase effluent in line 13 is the same as the rate of production from reactor 1 through line 10 because vessel 11 is maintained liquid full. The liquid hydrocarbon phase can be withdrawn to an intermediate hydrocarbon accumulation vessel which is also maintained liquid full, if desired. In distillation zone 14, distillation separations of streams of acid, propane, and normal butane are produced and withdrawn through lines 15, 16, and 17, respectively. There is also withdrawn an alkylate stream through line 18 and a stream comprising mainly isobutane through line 19 to isobutane surge drum 20. Fresh isobutane is introduced as needed into drum 20 through line 21. Isobutane flowing in line 4 from drum 20 is the isobutane combined with the olefin containing stream flowing in lines 7 and 3. Liquid level controller 22 adjusts valve 23 to control the rate of addition of fresh isobutane. The rate of flow in line 13 is maintained constant by flow rate controller 24 which adjusts valve 25 in line 13. This rate of flow is desirably maintained at a predetermined rate just below the incipient flooding velocity of the limiting distillation tower in distillation zone 14.

Since the alkylation reaction is a chemical combination of one molecule of isobutane with each molecule of olefin fed into the system, sufficient fresh isobutane must be added to match this consumption and fractionation losses. Also, for the purpose of operating a unit so as to produce an optimum amount of high quality alkylate, a considerable volume of isobutane is recycled within the unit so that at the reactor inlet, the volume ratio of isobutane to olefinic hydrocarbons is maintained at a predetermined ratio. This ratio is usually of the order of 4–6 to 1 for the optimum economic production of motor fuel constituents, although this ratio varies with different operations. The control system of the present invention is provided to maintain this ratio at a desired optimum constant value. To this end, a sample of the feed stream 3 to reactor 1 is removed through a sample conduit 26 which communicates with an olefin analyzer 27 and an isobutane analyzer 28. Analyzer 27 provides a first output signal which is representative of the concentration of olefins supplied to reactor 1. Analyzer 28 provides a second output signal which is representative of the concentration of isobutane supplied to reactor 1. These two output signals are applied as the respective inputs to a ratio controller 29. Ratio controller 29 provides an output signal which resets flow rate controller 8. In this manner, the ratio of isobutane to olefins supplied to reactor 1 through conduit 3 is adjusted as necesary to maintain a predetermined ratio. Controller 29 can be any conventional commercially available instrument which provides an output signal that is a function of the ratio of the two input signals applied thereto, such as, for example, the instrument described in catalogue 20–1 (1945) of the Brown Instrument Company, Philadelphia, Pennsylvania. This controller can conveniently operate by pneumatic pressure, for example. By means of this control system, the ratio of isobutane to total olefins supplied to reactor 1 is maintained at a desired value which results in the optimum economic production of motor fuel alkylates.

Any change in the setting of flow rate controller 8 dictated by ratio controller 29 will, of course, change the rate of flow through line 7 and, therefore, the total rate of flow through line 3, which tends to change the rate of flow in lines 10 and 13 but flow rate controller 24 has been provided in line 13 in order positively to maintain this rate substantially constant. Flow rate controller 24, in response to any slight change in the rate of flow in line 13 resets flow rate controller 5. Thus, for instance, if the percent of olefins in the stream flowing in line 7 decreases the ratio controller will reset flow rate controller 8 so that the total rate of flow of the stream flowing in line 7 will be increased to a value which would re-establish the predetermined isobutane to olefin ratio. At the same time, however, the total rate of flow in line 13 tends to increase so that the rate of flow in line 4 is decreased as a result of the resetting of flow rate controller 5 by flow rate controller 24. This decreased rate of flow in turn tends to cause ratio controller 29 to dictate a slight decrease in the rate of flow in line 7. Thus, operation of the interrelated controls is effective to maintain a substantially constant isobutane to olefin ratio in line 3 and at the same time to maintain a substantially constant rate of flow in line 13.

Figure 2:
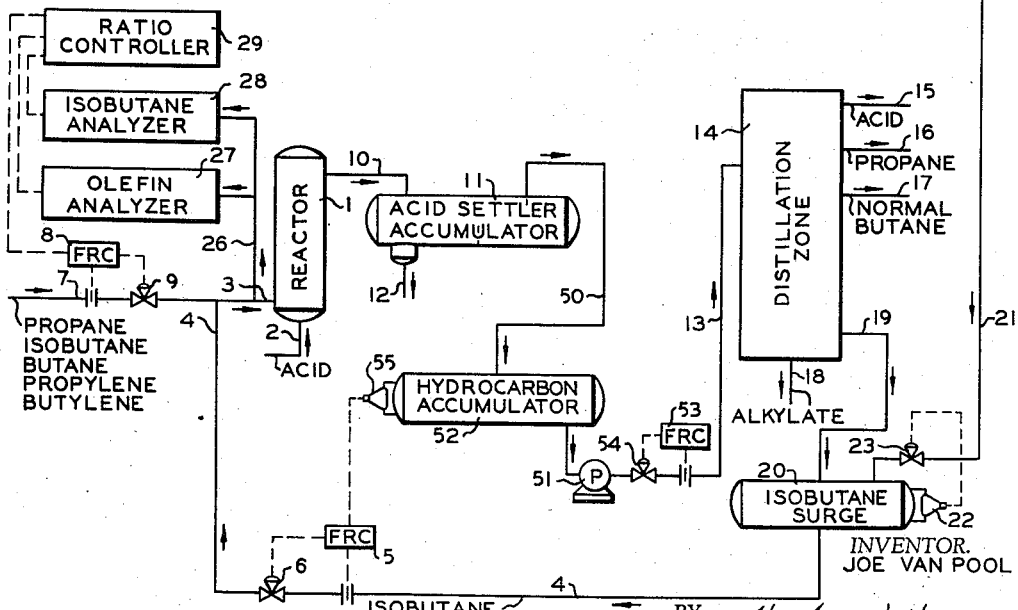
Figure 2 is a schematic representation of another embodiment of a control system of this invention especially useful where the pressure maintained in the reactor is below that pressure maintained in the distillation zone.

The analyzers employed in the control system of Figures 1, 2 and 3 can advantageously be infrared analyzers. A suitable analyzer of this type is illustrated schematically in Figure 4. A first beam of radiation from an infrared source 30 is directed by means of a reflector 31 through a sample cell 32 and a filter cell 33 to impinge upon a first temperature sensitive electrical resistance element 34. A second beam of radiation from source 30 is directed by a reflector 35 through sample cell 32 and a filter cell 36 to impinge upon a second temperature sensitive electrical resistance element 37. Cells 32, 33, and 36 are provided with windows 38 that are transparent to the infrared radiation in the region of interest. These windows can be formed of quartz, for example. The sample stream to be analyzed is introduced into cell 32 by means of an inlet conduit 39 and is removed through a vent conduit 40. A voltage source 41 is connected across resistance elements 34 and 37 which are connected in series relationship. The end terminals of a potentiometer 42 are connected to the respective terminals of voltage source 41. The junction between resistances 34 and 37, and the contactor of potentiometer 42 are connected to the respective input terminals of a servo amplifier 43. The output of amplifier 43 is connected to a reversible servo motor 44. The drive shaft of motor 44 is connected to the contactor of potentiometer 42 and to the input of a controller 45. Motor 44 can adjust a flapper valve in controller 45 to establish a pneumatic pressure representative of the motor rotation.

It should be evident that the illustrated electrical circuit comprises a modified form of alternating current Wheatstone bridge. Any electrical unbalance of the bridge is amplified by amplifier 43 which drives motor 44 in a direction to move the contactor of potentiometer 42 until the bridge is again in a balanced condition. The analyzer operates in a manner well known to those skilled in the art. For example, if the analyzer of Figure 4 is to be employed to detect isobutane in sample stream 26, cell 33 can be filled with a pure sample of isobutane. Cell 36 can be filled with air or other non-absorbing gas or normal butane. The purpose of cell 36 is to compensate for the radiation absorbed by the windows of filter cell 33 and absorption due to other components. The wave lengths of radiation which are absorbed by isobutane are removed from the radiation beam which is directed through filter cell 33. The amount of radiation transmitted through cell 36 and which impinges upon element 37 is a function of the isobutane concentration in sample cell 32. Any change in this concentration changes the ratio of the amounts of radiation impinging upon elements 34 and 37. Such a change in the electrical resistances of these elements changes the electrical unbalance of the bridge network. The amount of rotation of motor 44 which is needed to restore a balanced condition in the bridge is thus representative of the change in isobutane concentration in sample cell 32. The rotation of motor 44 is applied to controller 45. If controller 45 is a pneumatic instrument, for example, the drive shaft of motor 44 can be connected through suitable mechanical linkages to regulate a flapper valve in controller 45 to adjust the output air pressure. A telemetering potentiometer can be employed if it is desired to utilize an electrical controller. In any event, controller 45 provides an output signal which is representative of the concentration of isobutane in the cell.

In Figure 2, there is shown another embodiment of a control system of this invention, which is a modification especially useful when operating the reactor at a lower pressure than the distillation zone. In this figure, like numbers represent like parts and operate in the same manner as described with respect to Figure 1 except for the modifications to be noted. In this system, settler 11 is again operated liquid full, but there is a hydrocarbon accumulator to which the hydrocarbon phase produced from reactor 1 is passed through line 50. Pump 51 withdraws hydrocarbon from accumulator 52 through line 13 to distillation zone 14. The flow rate through conduit 13 is regulated to a constant value by flow rate controller 53 which adjusts valve 54. The rate of flow of isobutane in line 4 is again maintained at a constant value which is reset in response to the rate of production of the hydrocarbon phase from the reactor since the liquid level in accumulator 52 is maintained constant by level controller 55 which resets flow rate controller 5 in response to any change in the rate of production of hydrocarbon phase from reactor 10, which will effect the liquid level in accumulator 52.

In Figure 3, there is shown an embodiment of that portion of the control system analyzing for olefins and isobutane in the feed streams to the reactor, which is particularly useful if it is desired that the feed streams be separately analyzed and be not combined prior to their introduction into the alkylation reactor 1. This system can be used in the apparatus and process of Figures 1 and 2, replacing the olefin analyzer, isobutane analyzer and ratio controller of that figure. In Figure 3, like numbers are used for like elements as employed in Figures 1 and 2. In the system of Figure 3, the isobutane in line 4′, which corresponds to line 4 of Figures 1 and 2, flows directly into the reactor through that line, while the olefin stream in line 7′, which corresponds to line 7 of Figures 1 and 2, flows directly into reactor 1. In this system of Figure 3, sample conduits 64 and 66 communicate between inlet conduit 7′ and the inlets of an isobutane analyzer 65 and an olefin analyzer 67, respectively. A third sample conduit 69 communicates between conduit 4′ and the inlet of an isobutane analyzer 70. Isobutane analyzer 65 is provided because there are often moderate amounts of isobutane in the olefin feed stream. The output signals of analyzers 65, 67, and 70 which represent the concentrations of isobutane, olefins, and isobutane, respectively, are applied to the inputs of a computer network 73. A flow transmitter 68 provides a fourth input signal to computer 73 which is representative of the flow rate through conduit 7′. A second flow transmitter 75 provides a fifth input signal to computer 73 which is representative of the flow rate through conduit 4′. The computer 73, which can be an analogue or a digital computer, provides an output signal which is representative of the ratio by volume of the isobutane to total olefins supplied to reactor 10. This computer effectively solves the following equation and provides an output signal representative thereof:

$$\frac{\text{Volume of Isobutane}}{\text{Volume of Olefins}} = \frac{(C_{65} \cdot F_{68}) + (C_{70} \cdot F_{75})}{(C_{67} \cdot F_{68})}$$

where $C_{65}$ is the isobutane concentration measured by analyzer 65, $C_{70}$ is the isobutane concentration measured by analyzer 70, $C_{67}$ is the olefins concentration measured by analyzer 67, $F_{68}$ is the rate of flow through conduit 7′, and $F_{75}$ is the rate of flow through conduit 4′. In this manner, the desired volumetric ratio between isobutane and olefins to reactor 1 is maintained by controller 8′ being reset by the output signal of computer 73.

A computer 73 which can be employed in the control system of Figure 3 is illustrated schematically in Figure 5. Flow indicators 68 and 75 of Figure 3 provide electrical output signals representative of the respective measured flows. These input voltages $F_{68}$ and $F_{75}$ are applied to the illustrated input terminals of Figure 5. The upper terminal $F_{68}$ is connected to ground through a potentiometer 80. The contactor of potentiometer 80 is connected through a high value isolating resistor 81 to the input of a summing amplifier 82. Terminal $F_{75}$ is connected to ground through a potentiometer 83. The contactor of potentiometer 83 is connected through a high value isolating resistor 84 to the input of summing amplifier 82.

The contactors of potentiometers 80 and 83 are adjusted by motors 44a and 44b, respectively, which represent the motors 44 of analyzers 65 and 70, respectively. The motors are connected to the contactors of the potentiometers so as to move upwardly if the analyzer outputs increase and downwardly if the analyzer outputs decrease, thereby to perform the indicated multiplications. The output of amplifier 82 is connected to ground through a potentiometer 86. The second terminal $F_{68}$ is connected to ground through a potentiometer 87. The contactor of potentiometer 87 is connected to the input of a servo amplifier 88 which energizes a reversible servo motor 89. Amplifier 88 can be a conventional instrument which compares the input voltage with a reference voltage, converts the difference to a corresponding A.C. signal, and provides an output signal of phase representative of the input signal being greater or less than a reference value. Such an amplifier is described in detail in Electronic Control Handbook, Batcher and Moulic, 1946, page 298. The contactor of potentiometer 87 is adjusted by a motor 44c which represents the output of analyzer 67. Motor 89 is set to move the contactor of potentiometer 86 in a direction to divide the voltage across the potentiometer by the input voltage of amplifier 88. Thus, if the input voltage to amplifier 88 increases, the contactor of potentiometer 86 is moved downwardly to decrease the quotient voltage at the contactor of potentiometer 86. The magnitudes of the various voltages are calibrated to provide the indicated output signal. This signal resets controller 81′.

As a specific example of this invention, reactor 1 is operated at 90° F. and at a sufficient pressure to maintain a liquid state. The ratio of isobutane to olefin supplied to reactor 1, based on parts by weight, is 6:1. Hydrofluoric acid of 92 weight percent purity is employed as the catalyst. This acid is supplied to reactor 1 at a ratio of ½ to 1, based on catalyst to hydrocarbon parts by weight. The compositions and flow rates through the several conduits are as follows:

| Conduit | 7 | 13 | 16 | 17 | 18 | 19 | 21 |
|---|---|---|---|---|---|---|---|
| Propylene | 2,021 | | | | | | |
| Propane | 971 | 3,258 | 1,448 | | | 1,810 | 73 |
| Butylene | 2,363 | | | | | | |
| Isobutane | 1,496 | 20,749 | 20 | 25 | | 20,704 | 4,094 |
| n-Butane | 2,341 | 5,855 | | 3,855 | | 2,000 | 143 |
| Isopentane | | | | 20 | | | |
| Alkylate | | 7,489 | | | 7,469 | | |

The above figures are in barrels per day, based on condensed liquids.

From the foregoing, it should be evident that there is provided in accordance with this invention an improved control system for an alkylation unit. By means of the method and apparatus of this invention, it is possible to control the ratio of reactants to a constant value and at the same time to maintain a constant rate of production of hydrocarbon phase from the reactor which is fed at a constant rate to a distillation system, so that the limiting tower in the distillation system can be maintained at its maximum optimum rate below flooding velocity. While the invention has been described in conjunction with a particular reaction of isobutane and light olefins, it should be evident that it is not limited to this specific reaction.

It will be apparent to those skilled in the art that variations and modifications of the invention can be made from a study of the foregoing disclosure. Such variations and modifications are believed to be clearly within the spirit and scope of the invention.

I claim:

1. In an alkylation process wherein an olefin stream and an isoparaffin stream are continuously charged to a reaction zone, and a portion of said isoparaffin is alkylated with said olefins in said reaction zone, total hydrocarbon phase effluent from said reaction zone is continuously passed as feed to a fractional distillation zone, the improvement which comprises the combination of maintaining a substantially constant rate of flow of said total hydrocarbon phase effluent to said fractionation zone and simultaneously maintaining a substantially constant ratio of said isoparaffin to said olefins fed to said reaction zone by analyzing for the relative amounts of olefins and isoparaffins in said streams charged to said reaction zone and in response to the so determined ratio controlling the rate of flow of said olefin stream and thereby maintaining a constant predetermined ratio of isoparaffins to olefins charged while at the same time controlling the rate of flow of said isoparaffin stream in response to the rate of production of said total hydrocarbon phase effluent from said reaction zone and thereby simultaneously maintaining a constant predetermined rate of flow of said total hydrocarbon phase effluent to said fractional distillation zone.

2. In an alkylation process wherein an olefin stream and an isoparaffin stream are continuously charged to a reaction zone, and a portion of said isoparaffin is alkylated with said olefins in said reaction zone, total hydrocarbon phase effluent from said reaction zone is continuously passed as feed to a fractional distillation zone, the improvement which comprises the combination of maintaining a substantially constant rate of flow of said total hydrocarbon phase effluent to said fractionation zone and simultaneously mantaining a substantially constant ratio of said isoparaffin to said olefins fed to said reaction zone by analyzing for the relative amounts of olefins and isoparaffins in said streams charged to said reaction zone and in response to the so determined ratio controlling the rate of flow of said olefin stream and thereby maintaining a constant predetermined ratio of isoparaffins to olefins charged while at the same time directly controlling the rate of flow of said isoparaffin stream in response to the rate of flow of said total hydrocarbon phase effluent passed as feed to said fractional distillation zone and thereby simultaneously maintaining a constant predetermined rate of flow of said total hydrocarbon phase effluent to said fractional distillation zone.

3. In an alkylation process wherein an olefin stream and an isoparaffin stream are continuously charged to a reaction zone, and a portion of said isoparaffin is alkylated with said olefins in said reaction zone, total hydrocarbon phase effluent from said reaction zone is collected in an accumulation zone and continuously passed therefrom as feed to a fractional distillation zone, the improvement which comprises the combination of maintaining a substantially constant rate of flow of said total hydrocarbon phase effluent to said fractionation zone and simultaneously maintaining a substantially constant ratio of said isoparaffin to said olefins fed to said reaction zone by analyzing for the relative amounts of olefins and isoparaffins in said streams charged to said reaction zone and in response to the so determined ratio controlling the rate of flow of said olefin stream and thereby maintaining a constant predetermined ratio of isoparaffins to olefins charged while at the same time controlling the rate of flow of said isoparaffin stream in response to the liquid level in said accumulation zone and simultaneously maintaining a constant predetermined rate of flow of said total hydrocarbon phase effluent to said fractional distillation zone, said level being dependent upon the rate of production of said total hydrocarbon phase effluent from said reaction zone.

4. An improvement of claim 1 wherein the alkylation in said reaction zone is effected in the presence of liquid hydrofluoric acid catalyst.

5. In an alkylation unit wherein isoparaffins are alkylated with olefins in a reactor and total reactor effluent hydrocarbon phase is collected in an accumulator and thereafter fractionally distilled in fraction distillation means; a control system to maintain a predetermined ratio of isoparaffins to olefins in the hydrocarbon feed to said reactor and to maintain a predetermined rate of flow of said effluent to said fractional distillation means, comprising first conduit means communicating with said reactor to supply olefins, second conduit means communicating with said reactor to supply isoparaffins, first analyzing means to measure the flow of olefins through said first conduit means, second analyzing means to measure the flow of isoparaffins through said second conduit means, third conduit means communicating between said accumulator and said distillation means, means to maintain the flow in said third conduit means at a predetermined rate means responsive to said first and second analyzing means to control the rate of flow through said first conduit means to maintain a predetermined ratio of isoparaffins to olefins in the hydrocarbon feed to the reactor, and means, responsive to the rate of collection of said total hydrocarbon phase effluent in said accumulator, to control the rate of flow through said second conduit means.

6. In an alkylation unit wherein isoparaffins are alkylated with olefins in a reactor and total reactor effluent hydrocarbon phase is collected in an accumulator and thereafter fractionally distilled in fraction distillation means; a control system to maintain a predetermined ratio of isoparaffins to olefins in the hydrocarbon feed to said reactor and to maintain a predetermined rate of flow of said effluent to said fractional distillation means, comprising first conduit means communicating with said reactor to supply olefins, second conduit means communicating with said reactor to supply isoparafins, first analyzing means to measure the flow of olefins through said first conduit means, second analyzing means to measure the flow of isoparaffins through said second conduit means, third conduit means communicating between said accumulator and said distillation means, means to measure the rate of flow in said third conduit means, means responsive to said first and second analyzing means to control the rate of flow through said first conduit means to maintain a predetermined ratio of isoparaffins to olefins in the hydrocarbon feed to the reactor, and means responsive to said measuring means in said third conduit to control the rate of flow through said second conduit means so as to maintain a predetermined rate of flow in said third conduit.

7. A control system of claim 5 wherein said accumulator is maintained liquid full in its operation and wherein the means to control flow in said third conduit means comprises a first control valve in said third conduit operatively connected to and responsive to a first flow rate controller in said third conduit, a second control valve in said second conduit means, a flow rate controller which adjusts said second valve, and wherein said first controller is operatively connected to said second flow rate controller to reset same.

8. A control system of claim 5 wherein the means to control flow in said second conduit means comprises a liquid level controller operatively connected to said accumulator, a flow rate controller in said second conduit means operatively connected to a first control valve in said second conduit means, and said liquid level controller being operatively connected to reset said flow rate controller in said second conduit.

9. In an alkylation unit wherein isoparaffins are alkylated with olefins in a reactor and total reactor effluent hydrocarbon phase is collected in an accumulator and thereafter fractionally distilled in fractional distilling means; a control system to maintain a predetermined ratio of isoparaffins to olefins in the hydrocarbon feed to said reactor and to maintain a predetermined rate of flow of said effluent to said fractional distillation means, comprising a first conduit communicating with said reactor to introduce the hydrocarbon feed mixture, first conduit means communicating with said first conduit to supply olefins, second conduit means communicating with said first conduit to supply isoparafins, first analyzing means to measure the flow of olefins through said first conduit, second analyzing means to measure the flow of isoparaffins through said first conduit, third conduit means communicating between said accumulator and said distillation means, means to control the flow in said third conduit means at a predetermined rate, means responsive to said first and second analyzing means to control the rate of flow through said first conduit to maintain a predetermined ratio of isoparaffins to olefins in the hydrocarbon feed to the reactor, and means responsive to the rate of collection of said total hydrocarbon phase effluent in said accumulator to control the rate of flow through said second conduit means.

10. In an alkylation unit wherein isoparaffins are alkylated with olefins in a reactor and total reactor effluent hydrocarbon phase is collected in an accumulator and thereafter fractionally distilled in fractional distilling means; a control system to maintain a predetermined ratio of isoparaffins to olefins in the hydrocarbon feed to said reactor and to maintain a predetermined rate of flow of said effluent to said fractional distillation means, comprising a first conduit means communicating with said reactor to supply olefins, second conduit means communicating with said reactor to supply isoparaffins, first analyzing means to measure the concentration of olefins in said first conduit means, second analyzing means to measure the concentration of isoparaffins in said second conduit means, third analyzing means to measure the concentration of isoparaffins in said first conduit means, first flow measuring means to measure the flow through said first conduit means, second flow measuring means to measure the flow in said second conduit means, fourth conduit means communicating between said accumulator and said distillation means, means to control the flow in said fourth conduit means at a predetermined rate, means responsive to said first, second, and third analyzing means and said first and second flow measuring means to control the rate of flow through said first conduit means to maintain a predetermined ratio of isoparaffins to olefins in the hydrocarbon feed to the reactor, and means responsive to the rate of collection of said hydrocarbon phase effluent in said accumulator, to control the rate of flow through said second conduit means.

11. In an alkylation process wherein an olefin stream and an isoparaffin stream are continuously charged to a reaction zone, and a portion of said isoparaffin is alkylated with said olefins in said reaction zone, total hydrocarbon phase effluent from the reaction zone is continuously passed as feed to a fractional distillation zone, the improvement which comprises the combination of maintaining a substantially constant rate of flow of said total hydrocarbon phase effluent to said fractionation zone and simultaneously maintaining a substantially constant ratio of said isoparaffin to said olefins fed to said reaction zone, by controlling the rate of flow of said olefin stream in response to the relative amounts of isoparaffins to olefins being charged to said reactor and simultaneously controlling the rate of production of said total hydrocarbon phase effluent by controlling the rate of flow of said isoparaffin stream in response to said rate of production while directly maintaining positive rate of flow control of said hydrocarbon effluent to said fractionation zone.

12. A process of claim 1 wherein said olefin stream contains olefins having 3 and 4 carbon atoms and said isoparaffin stream contains isobutane.

13. A process of claim 4 wherein said olefin stream contains olefins having 3 and 4 carbon atoms and said isoparaffin stream contains isobutane.

References Cited in the file of this patent

UNITED STATES PATENTS

| | | |
|---|---|---|
| 2,386,831 | Wright | Oct. 16, 1942 |
| 2,431,500 | Penick | Nov. 25, 1947 |
| 2,462,946 | Coggeshall et al. | Mar. 1, 1949 |
| 2,580,651 | Boyd | Jan. 1, 1952 |
| 2,688,629 | Wadley et al. | Sept. 7, 1954 |